United States Patent
Gonzalez et al.

(10) Patent No.: US 12,188,802 B2
(45) Date of Patent: Jan. 7, 2025

(54) FLOW MEASUREMENT SYSTEM AND METHOD

(71) Applicant: HORIBA STEC, Co., Ltd., Kyoto (JP)

(72) Inventors: Esteban Daniel Gonzalez, Reno, NV (US); Andrew Wayne Price, Kyoto (JP); Walfredo Cantorna Publico, III, Reno, NV (US); Maximilian Martin Gundlach, Reno, NV (US)

(73) Assignee: HORIBA STEC, Co., Ltd., Kyoto (JP)

( * ) Notice: Subject to any disclaimer, the term of this patent is extended or adjusted under 35 U.S.C. 154(b) by 14 days.

(21) Appl. No.: 17/687,539

(22) Filed: Mar. 4, 2022

(65) Prior Publication Data

US 2023/0280197 A1    Sep. 7, 2023

(51) Int. Cl.
   *G01F 1/86* (2006.01)
   *G01N 11/04* (2006.01)

(52) U.S. Cl.
   CPC .............. *G01F 1/86* (2013.01); *G01N 11/04* (2013.01)

(58) Field of Classification Search
   CPC .................................. G01F 1/86; G01N 11/04
   USPC ......................................................... 73/861
   See application file for complete search history.

(56) References Cited

FOREIGN PATENT DOCUMENTS

JP           6209466 B2    10/2017

OTHER PUBLICATIONS

Agrawal, A. et al., "Survey on measurement of tangential momentum accommodation coefficient," Journal of Vacuum Science & Technology A, vol. 26, No. 4, Jun. 26, 2008, 13 pages.
Arkilic, E. et al., "Gaseous Slip Flow in Long Microchannels," Journal of Microelectromechanical Systems, vol. 6, No. 2, Jun. 1, 1997, 12 pages.
Bell, I. et al., "Pure and Pseudo-pure Fluid Thermophysical Property Evaluation and the Open-Source Thermophysical Property Library CoolProp," Industrial & Engineering Chemistry Research, vol. 53, No. 6, Jan. 13, 2014, 11 pages.
Berg, R. et al., "Recommended Viscosities of 11 Dilute Gases at 25° C.," Journal of Physical and Chemical Reference Data, vol. 41, No. 4, Dec. 13, 2012, 10 pages.
Cavazzuti, M. et al., "Compressible Fanno flows in micro-channels: An enhanced quasi-2D numerical model for aminar flows," Thermal Science and Engineering Progress, vol. 10, May 2019, 17 pages.
Chung, T. et al., "Applications of Kinetic Gas Theories and Multiparameter Correlation for Prediction of Dilute Gas Viscosity and Thermal Conductivity," Industrial & Engineering Chemistry Fundamentals, vol. 23, No. 1, Feb. 1, 1984, 6 pages.
Koeroghlian, M. et al., "Calculating a Viscosity Correction for Humid Air in a Laminar Flow Element", Proceedings of the 2018 SAE International WCX World Congress Experience, Apr. 3, 2018, Detroit, Michigan, USA, 10 pages.

(Continued)

*Primary Examiner* — Alexander A Mercado
*Assistant Examiner* — Rodney T Frank
(74) *Attorney, Agent, or Firm* — Alleman Hall & Tuttle LLP

(57) ABSTRACT

A flow measurement system is provided, which is configured to receive multiple flow rates; retrieve multiple physical properties for multiple pure gases; estimate multiple physical properties for a gas mixture; estimate multiple flow parameters for multiple channels of a flow splitter using a mathematical model, multiple physical properties for the gas mixture, and multiple pressure values from pressure sensors of multiple channels; and estimate multiple flow splits using multiple flow parameters for the multiple channels of the flow splitter.

11 Claims, 10 Drawing Sheets

(56) References Cited

OTHER PUBLICATIONS

May, E. et al., "Reference Viscosities of H2, CH4, Ar and Xe at Low Densities," International Journal of Thermophysics, vol. 28, No. 4, Aug. 1, 2007, 36 pages.

Poling, B. et al., "Chapter 9: Viscosity," The Properties of Gases and Liquids (Fifth Edition), Nov. 27, 2000, 99 pages.

Press, W. et al., Numerical Recipes in Fortran 77: The Art of Scientific Computing (Second Edition), Sep. 25, 1992, 1003 pages.

Wright, J. et al., "Design and Uncertainty Analysis for a PVTt Gas Flow Standard," Journal of Research of the National Institute of Standards and Technology, vol. 108, No. 1, Jan. 2003, 27 pages.

Wright, J. et al., "Errors in Rate-of-Rise Gas Flow Measurements from Flow Work," Proceedings of the 2018 International Symposium on Fluid Flow Measurement, Mar. 21, 2018, Queretaro, Mexico, 18 pages.

Yang, Z. et al., "Rarefied Gas Flow in Microtubes at Different Inlet-Outlet Pressure Ratios," CTRC Research Publications., Paper 125, Jan. 1, 2009, 16 pages.

"Mole fraction," Wikipedia, Available Online at https://en.wikipedia.org/w/index.php?title=Mole_fraction&oldid=1235745797, Version From Jul. 21, 2024, 5 pages.

"Carbon tetrafluoride," Wikipedia, Available Online at https://en.wikipedia.org/w/index.php?title=Carbon_tetrafluoride&oldid=1233964293, Version From Jul. 11, 2024, 6 pages.

"Helium," Wikipedia, Available Online at https://en.wikipedia.org/w/index.php?title=Helium&oldid=1239965913, Version From Aug. 12, 2024, 40 pages.

"Nitrogen," Wikipedia, Available Online at https://en.wikipedia.org/w/index.php?title=Nitrogen&oldid=1240237326, Version From Aug. 14, 2024, 30 pages.

"Molar mass," Wikipedia, Available Online at https://en.wikipedia.org/w/index.php?title=Molar_mass&oldid=1236952775, Version From Jul. 27, 2024, 7 pages.

"Viscosity models for mixtures," Wikipedia, Available Online at https://en.wikipedia.org/w/index.php?title=Viscosity_models_for_mixtures&oldid=1232440208, Version From Jul. 3, 2024, 29 pages.

"Kopp's law," Wikipedia, Available Online at https://en.wikipedia.org/w/index.php?title=Kopp%27s_law&oldid=1117318557, Version From Oct. 21, 2022, 2 pages.

Arkilic, E.B et al., "Gaseous slip flow in long microchannels," Journal of Microelectromechanical Systems, vol. 6, No. 2, Jun. 1, 1997, 16 pages.

Berg, R., "Simple flow meter and viscometer of high accuracy for gases," Metrologia, vol. 42, No. 1, Jan. 6, 2005, 14 pages.

"CRANIUM—Property Estimation Software," Molecular Knowledge Systems, Available Online at https://www.molecularknowledge.com/Cranium/Cranium.html, retrieved on Aug. 19, 2024, 3 pages.

| Gas | etaX25 MAE (%) | etaX25 RMS (%) | Average pressure (kPa) |
|---|---|---|---|
| Ar | 0.07 | 0.09 | 52 |
| C2H6 | 0.13 | 0.16 | 40 |
| C2H2F4 | 0.22 | 0.28 | 35 |
| Kr | 0.41 | 0.23 | 42 |
| Ne | 0.55 | 0.44 | 68 |
| SF6 | 0.13 | 0.15 | 38 |
| Xe | 0.2 | 0.21 | 37 |

Table 1

| Gas | etaX35 MAE (%) | etaX35 RMS (%) | Average pressure (kPa) |
|---|---|---|---|
| Ar | 0.56 | 0.12 | 52 |
| C2H6 | 0.27 | 0.19 | 21 |
| Kr | 0.31 | 0.39 | 42 |
| SF6 | 0.58 | 0.03 | 40 |
| Xe | 0.22 | 0.25 | 20 |

Table 2

FIG. 8A

| Gas | etaX25 Pa-s | etaX25 RMS (%) | Average pressure (kPa) |
|---|---|---|---|
| C4H2F6 | 1.03E-05 | 0.25 | 49 |
| C3HF5 | 1.181E-05 | 0.22 | 33 |

Table 3

| Gas | etaX35 / etaX25 | etaX35 / etaX25 RMS (%) | Average pressure (kPa) |
|---|---|---|---|
| C4H2F6 | 1.0421 | 0.13 | 36 |
| C3HF5 | 1.0365 | 0.16 | 16 |

Table 4

| Gas | Flow Model for Micro-channels MAE (%) | Computational Fluid Dynamics Method MAE (%) |
|---|---|---|
| Ar | 0.07 | 0.09 |
| C2H6 | 0.13 | 0.13 |
| Ne | 0.55 | 0.39 |
| SF6 | 0.13 | 0.11 |

Table 5

FIG. 8B

FLOW MEASUREMENT SYSTEM AND METHOD

BACKGROUND

In the field of fluid dynamics, a flow restrictor is a device configured to restrict the flow of a fluid in an engineered fluid path. The certainty of the performance of the flow restrictor to restrict the flow of the fluid is important for various applications, including gas delivery systems. For example, semiconductor manufacturing demands a high certainty that a predetermined flow rate of one gas, or flow rate ratio between two gases, can be achieved by a flow restrictor in a mass flow controller of the gas delivery systems used for the semiconductor manufacturing. Further, restrictors in flow meters can help achieve a high certainty in the accuracy of the flow rate indicated by the flow meter when measuring gas flow rates demanding high precision in semiconductor manufacturing. Such restrictors can be found in flow splitters or ratio controllers which divide a flow of mixture of gases into two or more streams. Therefore, decreasing the uncertainty in the performance of the flow restrictors of fluid flow devices such as flow splitters, mass flow controllers, and flow meters is desirable from the standpoint of increasing the quality of fluid delivery in various industrial applications. However, technical challenges have thus far stood as barriers to advancements in restrictor design.

In traditional mass flow controllers, flow rates of pure gases can be estimated reasonably accurately by conducting a calibration for each pure gas, and using the resultant calibration values, along with temperature and/or pressure readings from sensors in the mass flow controller, to compute a flow rate estimate using well-known equations for flow rate. However, this is impractical for gas mixtures because there are too many combinations for the components of the gas mixture and too many molar-fraction combinations for these components for a process engineer to conduct in a feasible amount of time a calibration process for each possible combination of gases in a mixture, for each mass flow controller. Moreover, such flow rate estimations have inherent uncertainties even for pure gases, and these uncertainties are compounded for mixtures of such gases. Thus, the use of calibrations for mixture gas flow estimation by a mass flow controller could increase uncertainty, worsening the accuracy of flow rate estimations. For these reasons, it is much more challenging to obtain flow splits accurately for gas mixtures than for pure gases. As a result, the flow rates of gas mixtures are often estimated under the simplified assumption that they behave like pure gases, which may lead to inaccurate estimations of flow rate.

SUMMARY

To address the issues discussed above, a flow measurement system is provided, comprising a flow splitter provided with a plurality of channels configured to flow a gas mixture, each of the plurality of channels provided with a pressure sensor. The flow measurement system further comprises a processor and a non-volatile memory storing: a mathematical model representing a flow of gas through the plurality of channels; a plurality of physical properties for the plurality of pure gases; and executable instructions that, in response to execution by the processor, cause the processor to: receive a plurality of flow rates; retrieve the plurality of physical properties for the plurality of pure gases; estimate a plurality of physical properties for the gas mixture; receive a plurality of pressure values from the pressure sensors of the plurality of channels; estimate a plurality of flow parameters for the plurality of channels of the flow splitter using the mathematical model, the plurality of physical properties for the gas mixture, and the plurality of pressure values from the pressure sensors of the plurality of channels; and estimate a plurality of flow splits using the plurality of flow parameters for the plurality of channels of the flow splitter.

According to another aspect, the flow measurement system further comprises a plurality of mass flow controllers arranged in parallel, each being configured to flow a respective one of the plurality of pure gases; a mixing chamber provided downstream of the plurality of mass flow controllers and configured to mix the plurality of pure gases to produce the gas mixture. The flow splitter is provided downstream of the mixing chamber; and the executable instructions, in response to execution by the processor, cause the processor to control the flow splitter in accordance with the estimated plurality of flow splits.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 8A and 8B show tables illustrating low error values between the viscosities determined for desired process gases and the reference viscosity values using the third method.

DETAILED DESCRIPTION

Figure 1:
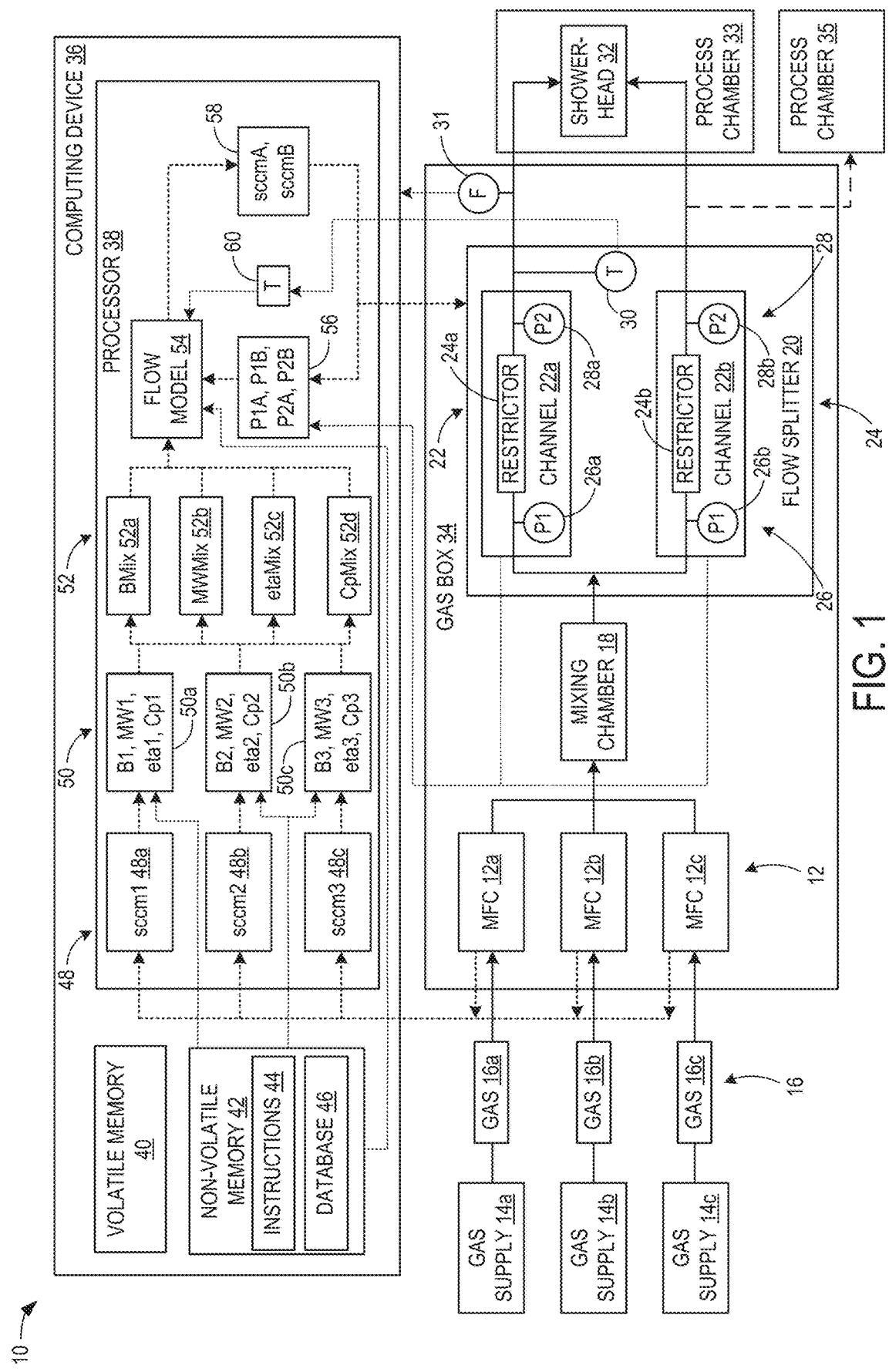
FIG. 1 shows a schematic view of a flow measurement system according to one example of the present disclosure.

In view of the above issues, FIG. 1 shows a flow measurement system 10 according to one example of the present disclosure. The flow measurement system 10 comprises a plurality of mass flow controllers 12 arranged in parallel, each being configured to flow a respective one of a plurality of pure gases 16. In this example, the first gas supply 14a supplies a first gas 16a to the first mass flow controller 12a; the second gas supply 14b supplies a second gas 16b to the second mass flow controller 12b; and the third gas supply 14c supplies a third gas 16c to the third mass flow controller 12c. The mass flow controllers 12 can include valves, pressure sensors, temperature sensors, and restrictors, the valves being controlled based on input from the pressure and temperature sensors of each mass flow controller 12, to supply gases at preset target flow rates.

A mixing chamber 18 is provided downstream of the plurality of mass flow controllers 12 and configured to mix the plurality of pure gases 16 to produce a gas mixture. Alternatively, the mixing chamber 18 may be replaced by a mixing manifold.

A flow splitter 20 is provided downstream of the mixing chamber 18 with a plurality of channels 22 configured to flow the gas mixture. Each of the plurality of channels 22a, 22b is provided with at least a pressure sensor and a restrictor. The first channel 22a and the second channel 22b are provided with a first restrictor 24a and a second restrictor 24b, respectively.

In this example, the first upstream pressure sensor 26a measures an upstream pressure P1A upstream of the first restrictor 24a, and the first downstream pressure sensor 28a of the first channel 22a measures a downstream pressure P2A downstream of the first restrictor 24a. The second upstream pressure sensor 26b of the second channel 22b measures an upstream pressure P1B upstream of the second restrictor 24b, and the second downstream pressure sensor 28b of the second channel 22b measures a downstream pressure P2B downstream of the second restrictor 24b.

The flow splitter 20 is provided with a temperature sensor 30 to measure a temperature T of the gas mixture. The processor 38 is configured to receive a plurality of temperature values from the temperature sensor 30, and the plurality of flow rates for the plurality of channels of the flow splitter 20 are estimated using the temperature values from the temperature sensor 30.

A flow rate sensor 31 can also be provided external to the flow splitter 20 to measure a flow rate of the gases. The flow rate sensor 31 may be another mass flow controller incorporating at least a restrictor, an orifice, or a heated capillary. The flow rate sensor 31 can alternatively be a chamber using the rate-of-rise method or the Pressure-Volume-Temperature and time (PVTt) method. The processor 38 is configured to receive a plurality of flow rates from the flow rate sensor 31. The plurality of flow rates for the plurality of channels 22 of the flow splitter 20 are estimated using the plurality of flow rates from the flow rate sensor 31.

Finally, a portion of the gas mixture from the first channel 22a is delivered to a respective zone of a showerhead 32, and a portion of the gas mixture from the second channel 22b is delivered to a different respective zone of the showerhead 32. The showerhead 32 is positioned within process chamber 33 in which a workpiece can be positioned to undergo a chemical process, such as chemical vapor deposition, vapor phase etching, etc., in the environment of the mixture gas. Alternatively, the portion of the gas mixture from the first channel 22a can be delivered to the first process chamber 33, while the portion of the gas mixture from the second channel 22b can be delivered to a second process chamber 35 different from the first process chamber 33.

In this example, a gas box 34 contains the mass flow controllers 12, the mixing chamber 18, and the flow splitter 20. However, it will be appreciated that in other examples, the gas box 34 can include additional components that are not depicted in FIG. 1. The additional components can include tubing, valves, sensors, calibration instruments, and computers. The gas box 34 can also include more mass flow controllers and channels in the flow splitter than the example of FIG. 1.

The computing device 36 comprises a processor 38 and volatile memory 40, which may be random access memory (RAM). In some implementations, the computing device 36 may be configured as a System on Module (SOM). The processor 38 may be a central processing unit (CPU), application-specific integrated circuit (ASIC), field-programmable gate array (FPGA), or other type of microprocessor, and may be a multi-core processor, for example.

The processor 38 is operatively coupled to non-volatile memory 42 which contains instructions 44 that, in response to execution by the processor 38, cause the processor 38 to receive a plurality of flow rates 48 from the plurality of mass flow controllers 12. In this example, a first flow rate 48a (sccm1) is received from the first mass flow controller 12a, a second flow rate 48b (sccm2) is received from the second mass flow controller 12b, and a third flow rate 48c (sccm3) is received from the third mass flow controller 12c.

The processor 38 then retrieves the plurality of physical properties 50 for the plurality of gases 16 flowing through the plurality of mass flow controllers 12. The physical properties may include thermophysical properties, in some examples. The physical properties 50 may be retrieved from a database 46 stored on the non-volatile memory 42. In this example, the first physical properties 50a are retrieved for the first gas 16a flowing through the first mass flow controller 12a, the second physical properties 50b are retrieved for the second gas 16b flowing through the second mass flow controller 12b, and the third physical properties 50c are retrieved for the third gas 16c flowing through the third mass flow controller 12c.

In this example, the physical properties include the virial coefficient B, molecular weight MW, viscosity eta, and heat capacity Cp of the gas. Of these, it will be appreciated that the virial coefficient, viscosity, and heat capacity are affected by temperature and thus are thermophysical properties. The first physical properties 50a include the first virial coefficient B1, the first molecular weight MW1, the first viscosity eta1, and the first heat capacity Cp1 of the first gas 16a. The second physical properties 50b include the second virial coefficient B2, the second molecular weight MW2, the second viscosity eta2, and the second heat capacity Cp2 of the second gas 16b. The third physical properties 50c include the third virial coefficient B3, the third molecular weight MW3, the third viscosity eta3, and the third heat capacity Cp3 of the third gas 16c. However, it will be appreciated that other combinations of physical properties of the gas may be alternatively used.

The processor 38 subsequently estimates a plurality of physical properties 52 for the gas mixture in the mixing chamber 18 based on the plurality of flow rates 48 and the plurality of physical properties 50. In this example, the physical properties 52 include the mixture virial coefficient 52a (BMix), the mixture molecular weight 52b (MWMix), the mixture viscosity 52c (etaMix), and the mixture heat capacity 52d (CpMix). Alternatively, other combinations of physical properties may be estimated.

The mixture molecular weight 52b (MWMix) and the mixture heat capacity 52d (CpMix) may be computed from first principles using the plurality of flow rates 48 from the plurality of mass flow controllers 12. The mixture virial coefficient 52a (BMix) may be computed using an equation of state, which may be Tsonopoulos' method or Peng-Robinson's equation of state, for example. The mixture viscosity 52c (etaMix) may be computed with a mixture-viscosity method, which may be Wilke's method or Reichenberg's method, for example. Additionally or alternatively, the mixture virial coefficient 52a (BMix) and the mixture viscosity 52c (etaMix) may be computed using conventional fluid equations of state.

The processor 38 subsequently receives a plurality of pressure values 56 from the pressure sensors 26, 28 of the plurality of channels 22, and estimates a plurality of flow parameters for the plurality of channels 22 of the flow splitter 20 using the mathematical flow model 54, the plurality of physical properties 52 for the gas mixture in the mixing chamber 18, the plurality of pressure values 56 from the pressure sensors 26, 28 of the plurality of channels 22, and the temperature values 60 from the temperature sensor 30. The processor 38 further estimates a plurality of flow splits 58 (sccmA, sccmB) using the plurality of estimated flow parameters for the plurality of channels 22 of the flow splitter 20. The mathematical flow model 54 may be retrieved from the database 46 stored on the non-volatile memory 42.

In this example, the plurality of flow splits 58 through the plurality of channels 22 are estimated using the mathematical flow model 54, which may be represented as F=f(G, MWMix, BMix, MAC, CpMix, etaMix, P1, P2, T), where F is flow rate (either sccmA or sccmB), f( . . . ) is a function which depends on the variables inside the parenthesis, G is the set of geometrical parameters describing the restrictor 24a, 24b, and MAC is a momentum accommodation coefficient, which is typically 0.9 to 1.

The function f may be a function for micro-tubes (for restrictors 24 which include micro-tubes), or a function for micro-channels (for restrictors 24 which include micro-channels). One example of function f for micro-channels is Arkilic's mathematical flow model 54 for micro-channels and ideal gases with MAC equal to one:

$$F = \frac{nh^3 w P_2^2}{24 \, etaX LRT}(P_R^2 - 1 + 12Kn(P_R - 1)) \quad \text{[Formula 1]}$$

Here, F is in kmol/s, n is the number of micro-channels in the restrictor, h is the channel thickness, w is its width, L its length, etaX is the gas viscosity, R is the universal gas constant (8314 J/K-kmol), T is temperature in Kelvins, PR=P1/P2, and Kn is the Knudsen number. Kn may be computed with the equation:

$$Kn = \sqrt{0.5\pi \, Cp/Cv} \, \frac{etaX}{c \, D2 \, h} \quad \text{[Formula 2]}$$

Here, Cp/Cv is the ratio of heat capacities, c is the sound speed in the gas, and D2 is the density evaluated at P2 and T. Alternatively, the flow rate F may be obtained using a computational fluid dynamics method, one-dimensional method, artificial neural networks, or a combination of the above.

The restrictors 24a, 24b may be configured with multiple micro-channels, and G may be a set of geometrical parameters including number of channels, and thickness, width, and length of the channels. Alternatively, the restrictors 24a, 24b may be configured with multiple micro-tubes, and G may be a set of geometrical parameters including number of micro-tubes, the length of the micro-tubes, and the diameter of the micro-tubes.

The processor 38 may control the flow splitter 20 in accordance with the estimated plurality of flow splits 58. In this example, the flow splitter 20 controls the split ratios sccmA/(sccmA+sccmB) and sccmB/(sccmA+sccmB), or more simply the ratio sccmA/sccmB, where sccmA is the first channel flow rate of the first channel 22a, and sccmB is the second channel flow rate of the second channel 22b.

The first channel flow rate (sccmA) of the first channel 22a or the second channel flow rate (sccmB) of the second channel 22b may be expressed by the formula F=f(G, MWMix, BMix, MAC, CpMix, etaMix, P1, P2, T), where f( . . . ) is a function depending on variables corresponding to the gases inside the channel: geometrical parameters G, the mixture molecular weight 52b (MWMix), the mixture virial coefficient 52a (BMix), momentum accommodation coefficient (MAC), the mixture heat capacity 52d (CpMix), the mixture viscosity 52c (etaMix), the upstream pressure P1, the downstream pressure P2, and gas temperature 60 (T). This formula may be expressed as F=F' F", where F'=f"(S), F"=f'(G, MWMix, BMix, MAC, CpMix, etaMix, P1, P2, T), F' is an empirical function dependent on a set of parameters S, and F' is a polynomial function or a hyperbolic function. The parameters S can include any combination of parameters among the ones inside the parenthesis of F" ( . . . ). F' and F" may be polynomials with a suitable number of terms. For example, F' may be a $5^{th}$ order polynomial as follows:

$$F'=a0+a_1 S+a_2 S^2+a_3 S^3+a_4 S^4+a_5 S^5 \quad \text{[Formula 3]}$$

Here, a0, a1, a2, a3, a4 and a5 are constants. F' may also be a function using hyperbolic functions such as:

$$F'=b_1-b_2 \tan h(b_3 S) \quad \text{[Formula 4]}$$

Here, b1, b2 and b3 are constants. F" may be obtained with a conventional formula using a viscosity-inference method. Alternatively, the flow rate F may be obtained using a computational fluid dynamics method, one-dimensional method, artificial neural networks, or a combination of the above.

Figure 2:
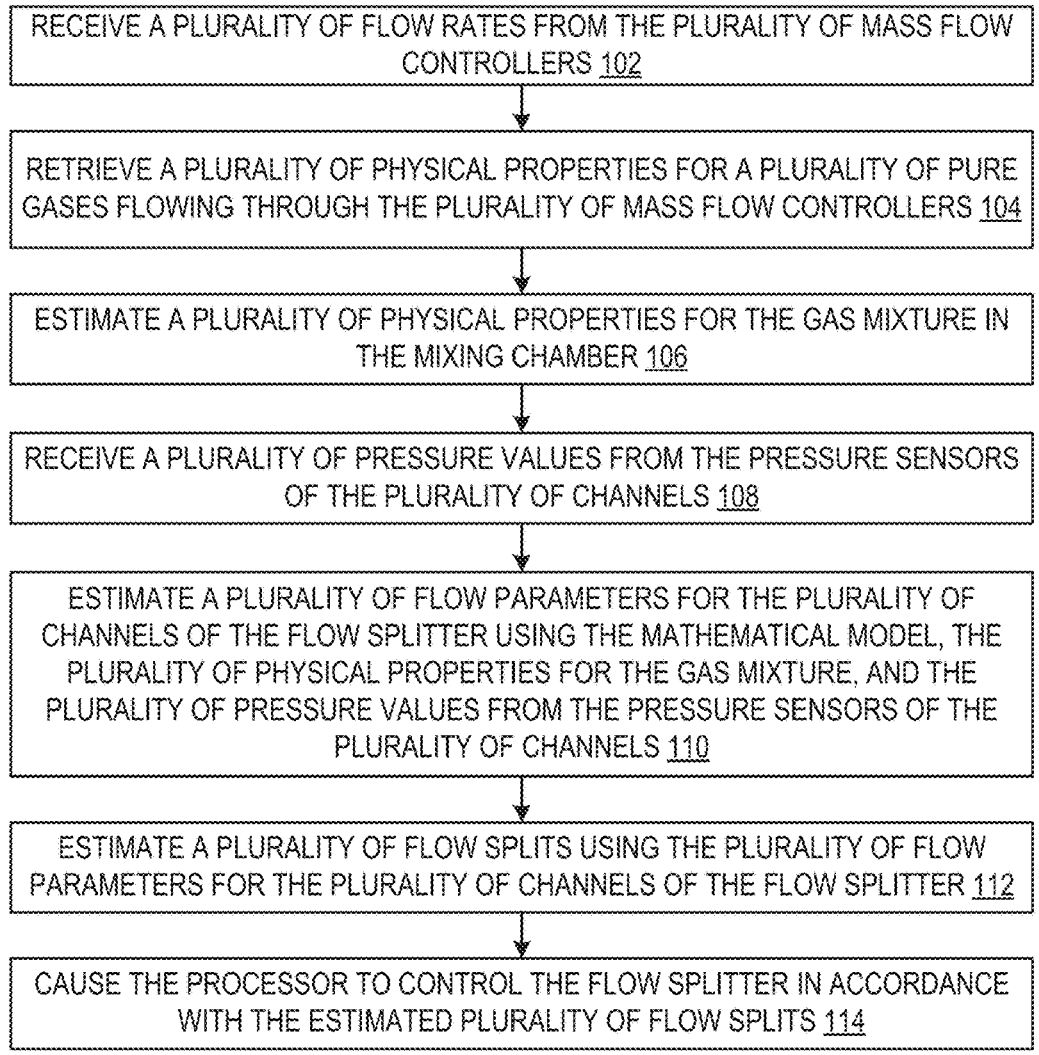
FIG. 2 shows a first method for estimating a plurality of flow splits for a plurality of flow channels of a flow splitter according to another example of the flow measurement system of FIG. 1.

Referring to FIG. 2, a first method 100 is described for estimating a plurality of flow splits for a plurality of channels of a flow splitter using a flow measurement system. As discussed above, the flow measurement system typically includes a plurality of mass flow controllers arranged in parallel, each being configured to flow a respective one of a plurality of pure gases, a mixing chamber provided downstream of the plurality of mass flow controllers and configured to mix the plurality of pure gases to produce a gas mixture, and a flow splitter provided downstream of the mixing chamber with a plurality of channels configured to flow the gas mixture. Each of the plurality of channels is typically provided with a pressure sensor. The system further typically includes non-volatile memory storing a mathematical model representing a flow of gas through the restrictor, and a processor. Alternatively, first method 100 may be used with other suitable hardware.

Thus, the following description of first method 100 is provided with reference to the software and hardware components described above and shown in FIG. 1. It will be appreciated that first method 100 also may be performed in other contexts using other suitable hardware and software components.

At step 102, a plurality of flow rates are received from a plurality of mass flow controllers. At step 104, a plurality of physical properties for the plurality of pure gases flowing through the plurality of mass flow controllers are retrieved. At step 106, a plurality of physical properties are estimated for the gas mixture in the mixing chamber. At step 108, a plurality of pressure values are received from the pressure sensors of the plurality of channels.

At step 110, a plurality of flow parameters are estimated for the plurality of channels of the flow splitter using the mathematical model, the plurality of physical properties for the gas mixture, and the plurality of pressure values from the pressure sensors of the plurality of channels.

At step 112, a plurality of flow splits are estimated using the plurality of flow parameters for the plurality of channels of the flow splitter. At step 114, the processor is caused to control the flow splitter in accordance with the estimated plurality of flow splits.

Figure 3:
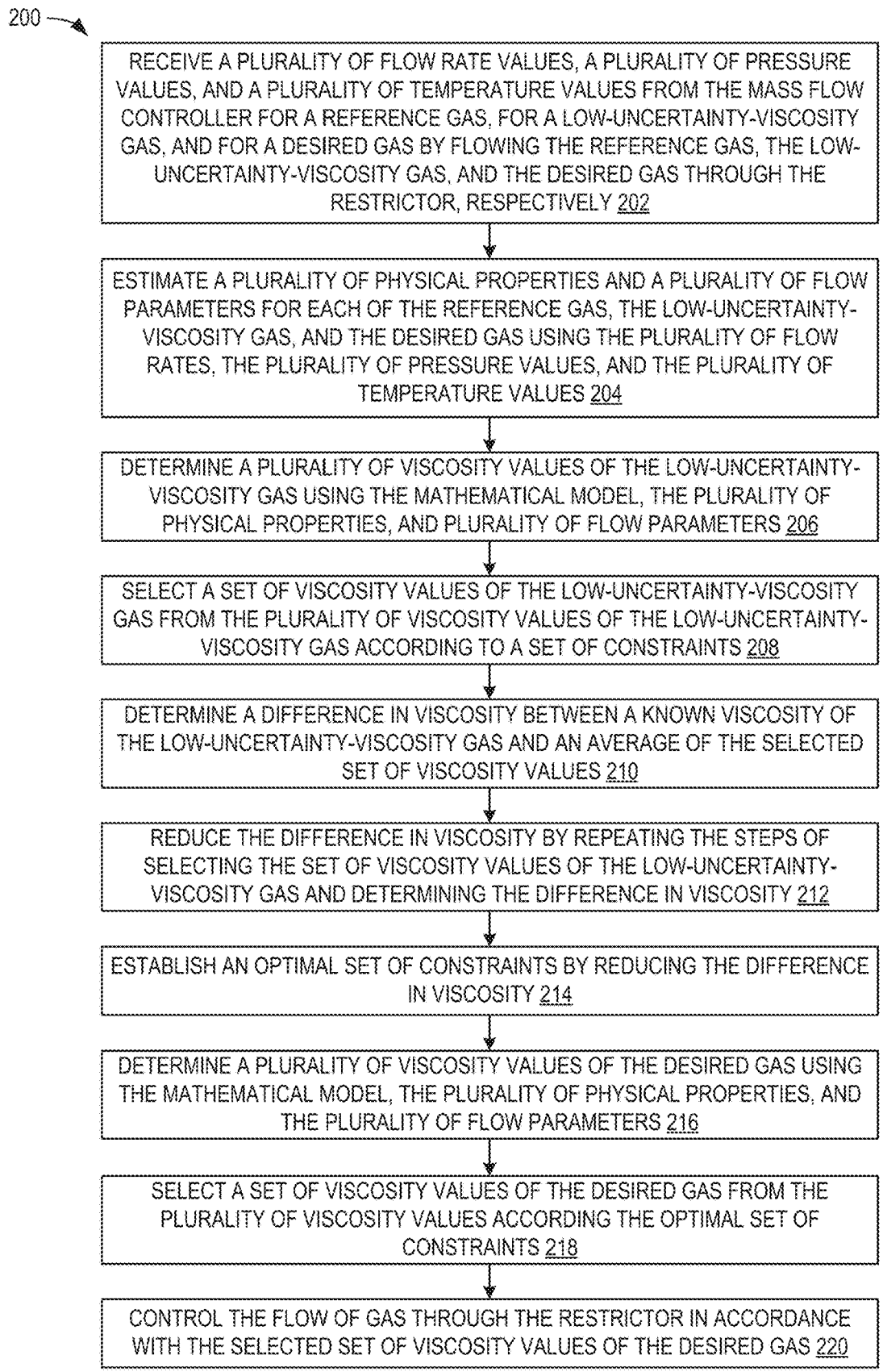
FIG. 3 shows a second method for obtaining a viscosity value of a desired process gas according to another example of the flow measurement system of FIG. 1.

Referring to FIG. 3, a second method 200 is described for obtaining a viscosity value of a desired process gas using a flow measurement system comprising a mass flow controller provided with a restrictor, flow rate sensor, a pressure sensor, and a temperature sensor, non-volatile memory storing a mathematical model representing a flow of gas through the restrictor, and a processor. The second method 200 may be used to determine a viscosity of at least one high-uncertainty gas among the plurality of pure gases flowing through the plurality of mass flow controllers in step 104 of the first method 100.

The following description of second method 200 is provided with reference to the software and hardware components described above and shown in FIG. 1. It will be appreciated that second method 200 also may be performed in other contexts using other suitable hardware and software components.

At step 202, a plurality of flow rate values, a plurality of pressure values, and a plurality of temperature values from the mass flow controller are received for a reference gas, for a low-uncertainty-viscosity gas, and for a desired gas by flowing the reference gas, the low-uncertainty-viscosity gas, and the desired gas through the restrictor, respectively. The desired gas may be a mixture of gases.

At step 204, a plurality of physical properties and a plurality of flow parameters are estimated for each of the reference gas, the low-uncertainty-viscosity gas, and the desired gas using the plurality of flow rates, the plurality of pressure values, and the plurality of temperature values. The physical properties can include at least one of virial coefficient, molecular weight, viscosity, and heat capacity, and the plurality of flow parameters can include at least a flow rate or a Mach number.

At step 206, a plurality of viscosity values of the low-uncertainty-viscosity gas are determined using the mathematical model, the plurality of physical properties, and the plurality of flow parameters. The mathematical model may be at least one of a computational fluid-dynamics model, a one-dimensional method, or an artificial neural network. The viscosity may be estimated using at least one of published values or Lucas' method or Chung's method, and the virial coefficient may be estimated using at least one of Tsonopoulos' method or Peng-Robinson's equation of state.

At step 208, a set of viscosity values of the low-uncertainty-viscosity gas is selected from the plurality of viscosity values of the low-uncertainty-viscosity gas according to a set of constraints.

At step 210, a difference in viscosity is determined between a known viscosity of the low-uncertainty-viscosity gas and an average of the selected set of viscosity values.

At step 212, the difference in viscosity is reduced by repeating the steps of selecting the set of viscosity values of the low-uncertainty-viscosity gas and determining the difference in viscosity. The Nelder-Mead algorithm may be used to repeat the steps of selecting the set of viscosity values of the low-uncertainty-viscosity gas and determining the difference in viscosity.

At step 214, an optimal set of constraints is established by reducing the difference in viscosity.

At step 216, a plurality of viscosity values of the desired gas is determined using the mathematical model, the plurality of physical properties, and the plurality of flow parameters.

At step 218, a set of viscosity values of the desired gas is selected from the plurality of viscosity values according to the optimal set of constraints.

At step 220, the flow of gas through the restrictor is controlled in accordance with the selected set of viscosity values of the desired gas.

Figure 4:
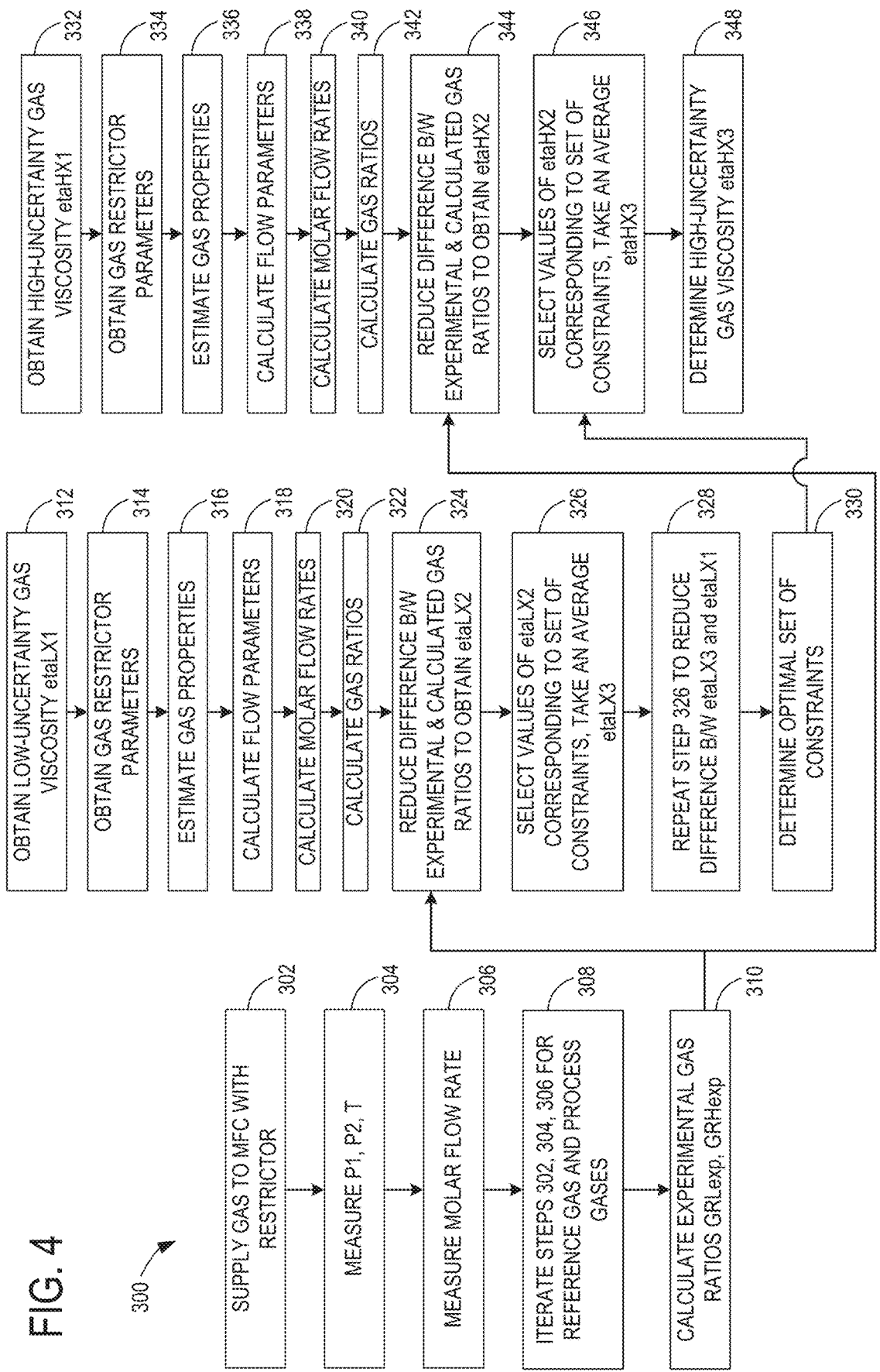
FIG. 4 shows a third method for obtaining a viscosity value of a desired process gas according to another example of the flow measurement system of FIG. 1.

Referring to FIG. 4, a third method 300 is described for determining a high-uncertainty-viscosity of at least one of a plurality of pure gases. The third method 300 may be used to determine a viscosity of at least one high-uncertainty gas among the plurality of pure gases flowing through the plurality of mass flow controllers in step 104 of the first method 100.

The following description of a third method 300 is provided with reference to the software and hardware components described above and shown in FIG. 1. It will be appreciated that the third method 300 also may be performed in other contexts using other suitable hardware and software components.

The third method 300 comprises an experimental portion (steps 302 to 310), a first calculation portion (steps 312 to 330), and a second calculation portion (steps 332 to 348).

Referring to the experimental portion (steps 302 to 310), at step 302, a gas supply supplies a reference gas to a first channel having a restrictor. One example of a reference gas is nitrogen. The restrictor can alternatively be configured as a laminar-flow element.

At step 304, an upstream pressure (P1) upstream of the restrictor is measured using an upstream pressure sensor, a downstream pressure (P2) downstream of the restrictor is measured using a downstream pressure sensor, and a gas temperature (T) of the reference gas is measured using a temperature sensor.

At step 306, a molar flow rate (F0exp) of the reference gas flowing out of the mass flow controller is measured with a flow rate sensor external to the first channel. The uncertainty of the flow rate sensor is preferably lower than the desired viscosity uncertainty.

At step 308, steps 302 to 306 are iterated for the process gas with low-uncertainty viscosity and the process gas with high-uncertainty viscosity. Thus, the iteration of steps 302 to 306 involves receiving a plurality of flow rate values, a plurality of pressure values, and a plurality of temperature values from the mass flow controller for a reference gas, for a low-uncertainty-viscosity gas, and for the desired gas (process gas with high-uncertainty viscosity) by flowing the reference gas, the low-uncertainty-viscosity gas, and the desired gas through a restrictor, respectively.

Examples of process gases with low-uncertainty viscosities include argon (Ar), sulfur hexafluoride (SF6), and xenon (Xe). It will be appreciated that the molar flow rates of the process gas with low-uncertainty viscosity and the process gas with high-uncertainty viscosity are preferably measured under similar upstream pressures (P1), similar downstream pressures (P2), and similar gas temperatures (T) using the same restrictor with the same set of geometrical parameters (G).

At step 310, the experimental gas ratios GRLexp and GRHexp are calculated for each of the process gas with low-uncertainty viscosity and the process gas with high-uncertainty viscosity, respectively. The experimental gas ratio GRLexp for the process gas with low-uncertainty viscosity is calculated by the formula GRLexp=FXLexp/F0exp, where FXLexp is the experimental molar flow rate of the process gas with the low-uncertainty viscosity, and F0exp is the experimental molar flow rate of the reference gas. The experimental gas ratio GRHexp for the process gas with high-uncertainty viscosity is calculated by the formula GRLexp=FXHexp/F0exp, where FXHexp is the experimental molar flow rate of the process gas with the high-uncertainty viscosity, and F0exp is the experimental molar flow rate of the reference gas. Hence, the experimental gas ratios GRLexp and GRHexp are functions of the upstream pressure (P1), downstream pressure (P2), and the gas temperature (T).

Referring to the first calculation portion (steps 312 to 330), at step 312, a low-uncertainty viscosity etaLX1 is obtained of the process gas with a known low-uncertainty viscosity. Alternatively, the low-uncertainty viscosity etaLX1 may be estimated using a conventional method.

At step 314, a set of geometrical parameters G are obtained of the restrictor. For example, for a multiple-micro-channel restrictor, this set includes the number of channels, and the thickness, width, and length of the channels. For a multiple-micro-tube restrictor, this set includes the number of tubes, the length of the tubes, and the diameter of the tubes.

At step 316, a plurality of physical properties are estimated for the reference gas and the process gas with the low-uncertainty viscosity. The physical properties may include thermophysical properties. Examples of these physical properties include molecular weight MW, virial coefficient B, momentum accommodation coefficient MAC, heat capacity Cp, and the viscosity eta. Other combinations of properties may be used.

At step 318, a plurality of flow parameters are estimated for the process gas with the low-uncertainty viscosity using the various gas properties estimated in step 316. Examples of these parameters include the Mach number Ma, and the Knudsen number Kn. Ma is the mass flow rate divided by the product of the following: average gas density in the restrictor, the sound speed in the gas, the restrictor flow path cross-sectional area (e.g., thickness times width in a micro-channel, pi times squared radius in a micro-tube), and the restrictor total number of flow paths. Kn is the ratio of the gas mean free path and a restrictor length scale, such as the channel thickness in a multiple-micro-channel restrictor.

At step 320, the reference gas molar flow rate F0, and the molar flow rate FXL for the process gas with low-uncertainty viscosity are calculated using a mathematical flow model describing the flow in the restrictor. The mathematical flow model may be stored in a database in non-volatile memory. In the mathematical flow model, F0 may be expressed as F0=f(G, MW0, B0, MAC, Cp0, etaX0, P1, P2, T), and FXL may be expressed as FXL=f(G, MWL, BL, MAC, CpL, etaXL, P1, P2, T).

G is the set of geometrical parameters of the restrictor, MW0 and MWL are the molecular weights of the reference gas and the low-uncertainty-viscosity gas respectively, B0 and BL are the virial coefficients of the reference gas and the low-uncertainty-viscosity gas respectively, Cp0 and CPL are the heat capacities of the reference gas and the low-uncertainty-viscosity gas respectively, etaX0 are etaXL are the viscosities of the reference gas and the low-uncertainty-viscosity gas respectively, P1 is the upstream pressure upstream of the restrictor, P2 is the downstream pressure downstream of the restrictor, and T is the temperature of the gas.

At step 322, the gas ratio, GRLcalc is calculated using the flow rates calculated in step 320. The gas ratio GRLcalc may be calculated using the formula GRLcalc=FXL/F0.

At step 324, steps 320 and 322 are iterated using different values of etaLX to reduce the difference between the calculated gas ratio GRLcalc and the experimental gas ratio GRLexp of the process gas with low-uncertainty viscosity obtained at step 310. This may be done, for example, using the Nelder-Mead algorithm. Thus, a plurality of viscosity values etaLX of the low-uncertainty-viscosity gas are determined.

At step 326, a calculated value etaLX2 corresponding to a set of constraints is selected among the different values of etaLX. In other words, a set of viscosity values of the low-uncertainty-viscosity gas is selected from the plurality of viscosity values of the low-uncertainty-viscosity gas according to a set of constraints. An example of this set is Ma<Ma*; Kn<Kn*; F0exp>F*; FXLexp>F*; P1<P*; and P2<P*. Here, the quantities with an asterisk are predetermined values. Then, an average etaLX3 of the selected values of etaLX is calculated.

At step 328, step 326 is repeated using different sets of constraints to reduce the difference between the average etaLX3 and the known low-uncertainty gas viscosity etaLX1 obtained in step 312. The different sets of constraints may be retrieved from a database stored in non-volatile memory. In this step, a difference in viscosity between a known viscosity of the low-uncertainty-viscosity gas and an average of the selected set of viscosity values is determined, and the difference in viscosity is reduced by repeating the steps of selecting the set of viscosity values of the low-uncertainty-viscosity gas and determining the difference in viscosity.

At step 330, an optimal set of constraints is established by reducing the difference between the average etaLX3 and the known low-uncertainty gas viscosity etaLX1 obtained in step 312. For the above example, this step finds optimal values of Ma*, Kn*, F*, and P* to reduce uncertainty.

Referring to the second calculation portion (steps 332 to 348), at step 332, a high-uncertainty viscosity etaHX1 is obtained of the process gas with a known high-uncertainty viscosity. Alternatively, the high-uncertainty viscosity etaHX1 may be estimated using conventional methods.

At step 334, a set of geometrical parameters G of the restrictor are obtained, similarly to step 314.

At step 336, a plurality of physical properties are estimated for the reference gas and the desired gas (process gas with the high-uncertainty viscosity), similarly to step 316.

At step 338, a plurality of flow parameters are estimated for the process gas with the high-uncertainty viscosity using the various gas properties estimated in step 336.

At step 340, the molar flow rates for the reference gas, F0, and the process gas FXH with the high-uncertainty viscosity are calculated using the mathematical model describing the flow in the restrictor. In the mathematical flow model, F0 may be expressed as F0=f(G, MW0, B0, MAC, Cp0, etaX0, P1, P2, T), and FXH may be expressed as FXH=f(G, MWH, BH, MAC, CpH, etaXH, P1, P2, T). MWH is the molecular weight of the high-uncertainty-viscosity gas, BH is the virial coefficient of the high-uncertainty-viscosity gas, CpH is the heat capacity of the high-uncertainty-viscosity gas, and etaXH is the viscosity of the high-uncertainty-viscosity gas.

At step 342, the gas ratio, GRHcalc is calculated using the flow rates calculated in step 320. The gas ratio GRHcalc may be calculated using the formula GRHcalc=FXH/F0.

At step 344, steps 340 and 342 are iterated using different values of etaHX to reduce the difference between the calculated gas ratio GRHcalc and the experimental gas ratio GRHexp of the process gas with high-uncertainty viscosity obtained at step 310. This may be done, for example, using the Nelder-Mead algorithm. Thus, a plurality of viscosity values of the desired gas (high-uncertainty-viscosity gas) are determined using the mathematical model, the plurality of physical properties, and the plurality of flow parameters.

At step 346, a calculated value etaHX2 corresponding to the optimal set of constraints obtained at step 330 is selected among the different values of etaHX. In other words, a set of viscosity values of the desired gas (high-uncertainty-viscosity gas) is selected from the plurality of viscosity values of the high-uncertainty-viscosity gas according to the optimal set of constraints. An example of this set of constraints is Ma<Ma*; Kn<Kn*; F0exp>F*; FXHexp>F*; P1<P*; and P2<P*. Here, the quantities with an asterisk are values that were estimated for the process gas with the low-uncertainty viscosity in the first calculation portion (steps 312 to 330). Then, an average etaHX3 is taken over the selected values of etaHX.

At step 348, the viscosity of the process gas with the high-uncertainty viscosity is determined based on the average etaHX3.

The third method 300 may be used to obtain viscosities at different temperatures, when the viscosity at one temperature is known. For example, when the viscosity of a process gas is known to be etaX25 at 25° C., the third method 300 can be used to determine the viscosity etaX35 of the process gas at 35° C. For this example, the reference process gas is the process gas at 25° C. Since the set of constraints is already known, there is no need to conduct the first calculation portion, or the steps for determining the optimal set of constraints for the low-uncertainty process gas. Therefore, in the experimental portion of the third method 300, the reference gas is the process gas at 25° C., and steps 302, 304, and 306 are iterated for the process gas at 35° C.

Subsequently, the steps of the second calculation portion (steps 332 to 348) are performed by using the process gas at 25° C. as the reference gas, and the viscosity of the process gas at 35° C. is determined by solving for the high-uncertainty gas viscosity at step 348. This approach may be repeated for other temperatures.

The second method 200 and the third method 300 may be used in a semiconductor manufacturing process in a variety of applications, including the calibration of the mass flow controllers before installation, the re-calibration of the mass flow controllers during re-installation or maintenance, and the measurement of gas viscosity during semiconductor manufacturing operations.

Figure 5:
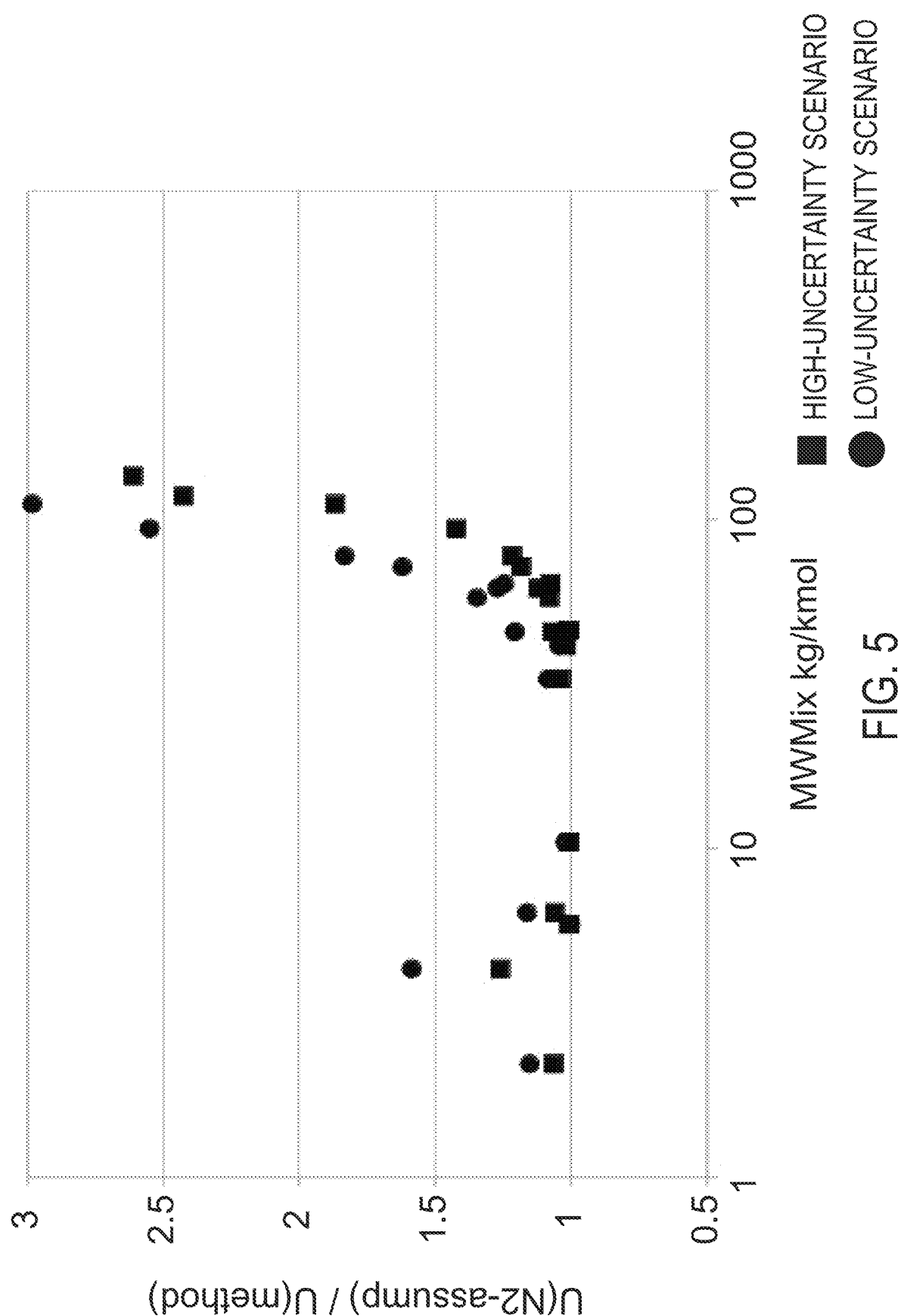
FIG. 5 is a chart illustrating the reduced uncertainties of the flow split estimations using the first method compared to conventional methods.

Referring to FIG. 5, the results of a Monte-Carlo analysis of flow-split (sccmA/sccmB) uncertainties are shown. These results are for values of total flow rate, P1, P2 and T typical of flow splitters, and for 18 mixtures typical of semiconductor-manufacturing applications. For this purpose, a mathematical flow model F with F' was used. The input uncertainties (mass flow controller sccm; eta and Cp for each pure gas; etaMix and CpMix; G; P1, P2 and T) were varied according to two scenarios: one was a high-uncertainty scenario, shown with squares in FIG. 5; and the other was a low-uncertainty scenario, shown with circles in FIG. 5.

The horizontal axis of FIG. 5 is a logarithmic scale indicating the molecular weight MWmix of the gas mixture. The vertical axis is the ratio of the uncertainty of a conventional method, indicated as U(N2-assump), which uses the assumption that all of the gases behave like nitrogen, and the uncertainty of the first method 100, U(Method).

In FIG. 5, values of U(N2-assump)/U(Method) are larger than one, indicating that the first method 100 reduces uncertainty compared to the conventional method. For example, when U(N2-assump)/U(Method)=2, the first method 100 reduces uncertainty by a factor of 2. FIG. 5 indicates that U(N2-assump)/U(Method) is close to one for various mixtures with molecular weight close to the nitrogen molecular weight of 28 kg/kmol. For these mixtures, the prior-art method is sufficient to achieve accurate flow splits. However, FIG. 5 also shows that for several mixtures with molecular weights larger or smaller than the nitrogen molecular weight of 28 kg/kmol, the first method 100 reduces uncertainty compared to the conventional method. This reduction is pronounced in mixtures that are significantly heavier or lighter than nitrogen. Therefore, compared to conventional methods, the first method 100 offers a way to achieve accurate flow splits for a broader range of mixtures.

Figure 6:
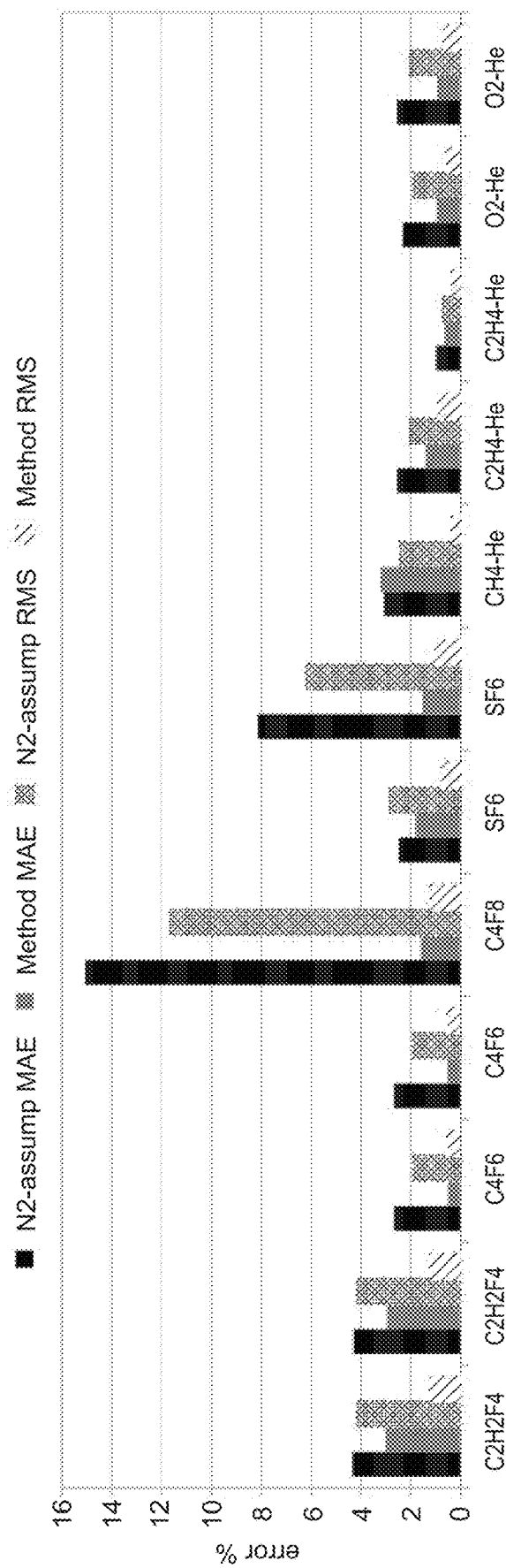
FIG. 6 shows a chart illustrating the error reduction in flow-split estimations using the first method compared to conventional methods.

FIG. 6 shows flow-split errors with reference to experimental data when using the prior-art method versus the first method 100. The prior-art method, marked as N2-assump in FIG. 6, uses the assumption that all of the gases behave like nitrogen. Two error metrics are shown: mean absolute errors (MAE) and root-mean-square errors (RMS). The process gases that were studied in FIG. 6 were two instances of tetrafluoroethane (C2H2F4), two instances of hexafluoro-1,3,-butadiene (C4F6), octafluorocyclobutane (C4F8), two instances of sulfur hexafluoride (SF6), one methane-helium (CH4-He) mixture, two ethane-helium (C2H4-He) mixtures, and two oxygen-helium (O2-He) mixtures. Results are for pressures on the high end of those typical of flow splitters. FIG. 6 shows that the error is less with the first method 100 than conventional methods (except for one instance of MAE). Moreover, FIG. 6 indicates that the error reduction with the first method 100 may be significant, in particular in octafluorocyclobutane (C4F8), hexafluoro-1,3,-butadiene (C4F6), one instance of sulfur hexafluoride (SF6), and two oxygen-helium (O2-He) mixtures.

Figure 7:
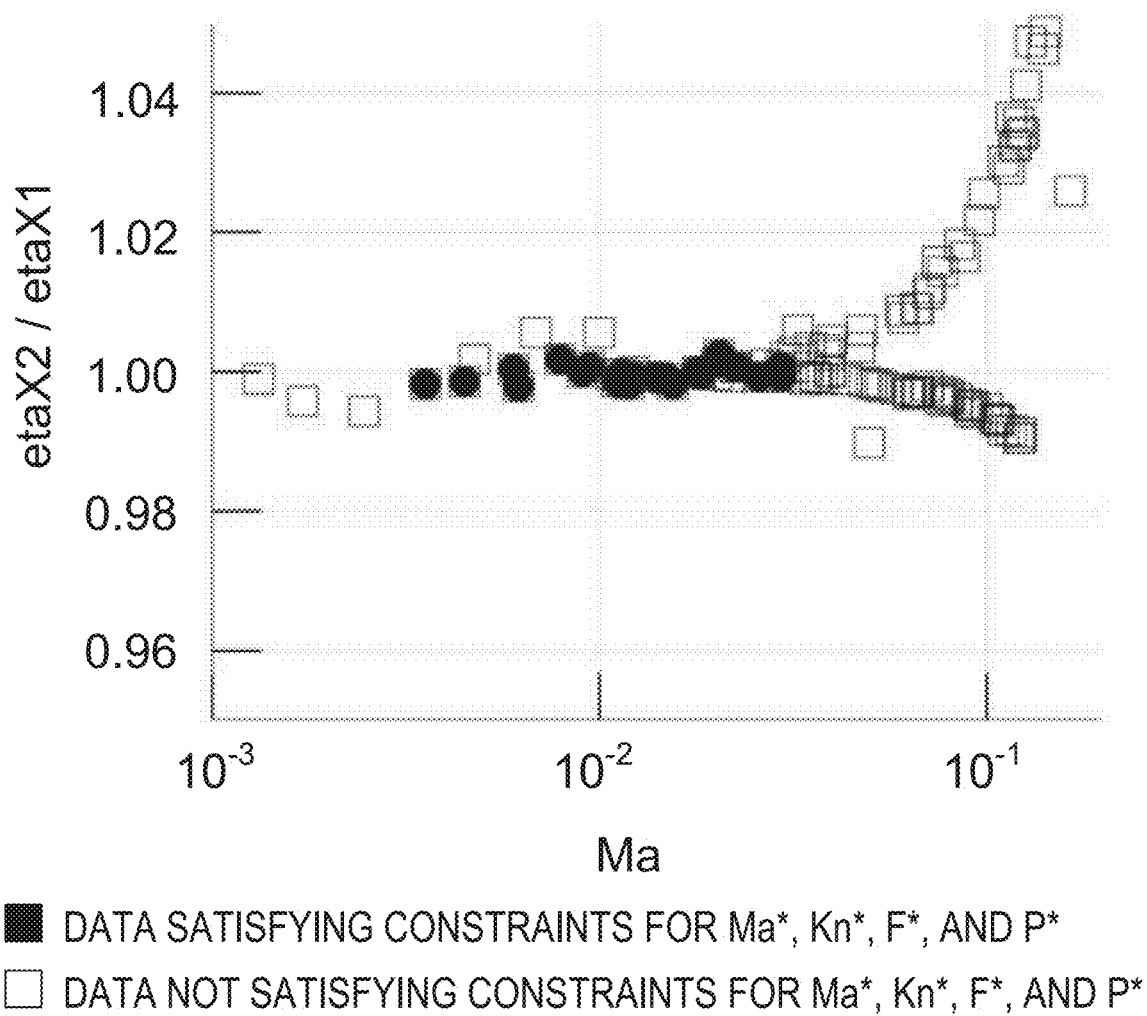
FIG. 7 shows a chart illustrating the reduction in deviation of the measured viscosity from the reference viscosity using the first method compared to conventional methods.

FIG. 7 shows for argon (Ar) and sulfur hexafluoride (SF6) the ratio of the viscosity obtained with the third method 300 (etaX2) and a reference viscosity (etaX1) plotted against Mach number (Ma). Data satisfying constraints for Ma*, Kn*, F* and P* are indicated with dark squares, while the data not satisfying the constraints are indicated with white squares. Ideally, all data would stay at etaX2/etaX1=1. If all the data points were used, the deviation of the measured viscosity with respect to the reference viscosity would be up to 4%, which would be within many published viscosity values. However, by enforcing the above set of constraints, this deviation is about 0.1%. This is an enhancement of an order of magnitude.

Referring to FIGS. 8A, Table 1 shows mean absolute errors (MAE) and root-mean-squared (RMS) values between viscosities determined for each of the process gases at 25° C. using the third method 300, and reference zero-density viscosity values at 25° C. that were published for each of the process gases. The process gases that were studied in Table 1 were argon (Ar), ethane (C2H6), tetrafluoroethane (C2H2F4), krypton (Kr), neon (Ne), sulfur hexafluoride (SF6), and xenon (Xe). As shown in Table 1, the MAE values and RMS values were all less than 1%.

Similarly, Table 2 shows MAE values and RMS values between viscosities determined for each of the process gases at 35° C. using the third method 300, and reference zero-density viscosity values at 35° C. that were published for each of the process gases. The process gases that were studied in Table 2 were argon (Ar), ethane (C2H6), krypton (Kr), sulfur hexafluoride (SF6), and xenon (Xe). As shown in Table 2, the MAE values and RMS values were all less than 1%.

Referring to FIG. 8B, Table 3 shows high-uncertainty-viscosities and their RMS values determined for each of the process gases at 25° C. using the third method 300. The process gases that were studied in Table 3 were hexafluoroisobutene (C4H2F6) and 1,1,3,3,3-pentafluoropropene (C3HF5). As shown in Table 3, the RMS values were all less than 1%.

Table 4 shows viscosity ratios at different temperatures and their RMS values determined for each of the high-uncertainty-viscosity process gases using the third method 300. The process gases that were studied in Table 4 were hexafluoroisobutene (C4H2F6) and 1,1,3,3,3-pentafluoropropene (C3HF5). The viscosity ratios were calculated by dividing the viscosity determined at 35° C. by the viscosity determined at 25° C. As shown in Table 4, the RMS values were all less than 1%.

It will be appreciated that the results in Tables 1 to 4 were obtained using the mathematical flow model for micro-channels and ideal gases with MAC equal to one.

Referring to FIG. 8B, Table 5 shows two sets of MAE values. The left column shows a first set of MAE values between viscosities determined for each of the process gases using the third method 300 and a mathematical flow model for restrictors with micro-channels, and reference zero-density viscosity values that were published for each of the process gases. The right column shows a second set of MAE values between viscosities determined for each of the process gases using the third method 300 and a computational fluid dynamics method, and reference zero-density viscosity values that were published for each of the process gases. The process gases that were studied in Table 5 were argon (Ar), ethane (C2H6), neon (Ne), and sulfur hexafluoride (SF6) As shown in Table 5, only a relatively small difference was found between the two approaches for determining viscosities.

It will be appreciated that the results in Tables 1 to 5 were obtained by enforcing the following set of constraints for all the process gases: Ma<Ma*=0.03; Kn<Kn*=0.03; FN2exp>F*=0.1 sccm; FXexp>F*.

In accordance with the present disclosure, flow rates of gas mixtures can be estimated accurately, and flow splits of flow splitters can be obtained more accurately for gas mixtures.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
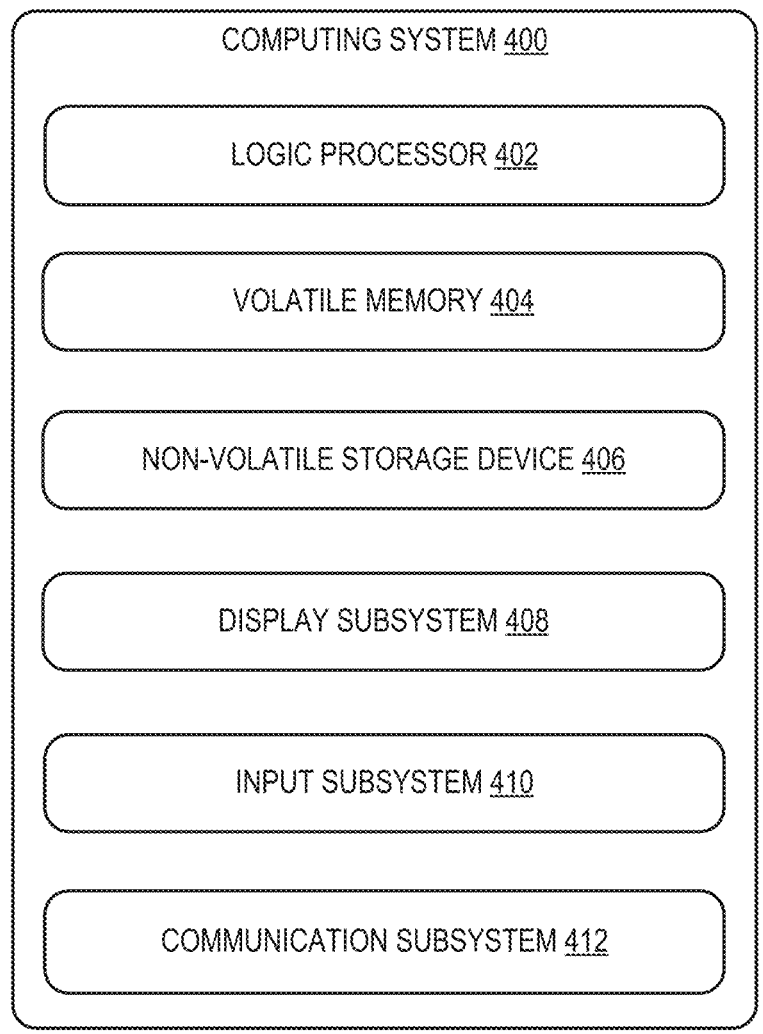
FIG. 9 shows a schematic view of an example computing environment in which the methods used with the flow measurement system of FIG. 1 may be enacted.

FIG. 9 schematically shows a non-limiting embodiment of a computing system 400 that can enact one or more of the processes described above. Computing system 400 is shown in simplified form. Computing system 400 may embody the computing device 36 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein may define patentable subject matter apart from the disclosed examples and may find utility in other implementations not expressly disclosed herein.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

The invention claimed is:

1. A flow measurement system, comprising:
  a flow splitter provided with a plurality of channels configured to flow a gas mixture of a plurality of pure gases, each of the plurality of channels provided with a pressure sensor;
  a processor; and
  a non-volatile memory storing:
    a mathematical model representing a flow of gas through the plurality of channels;
    a plurality of physical properties for the plurality of pure gases; and
    executable instructions that, in response to execution by the processor, cause the processor to:
      retrieve the plurality of physical properties for the plurality of pure gases;
      estimate a plurality of physical properties for the gas mixture;
      receive a plurality of pressure values from the pressure sensors of the plurality of channels;
      estimate a plurality of flow parameters for the plurality of channels of the flow splitter using the mathematical model, the plurality of physical properties for the gas mixture, and the plurality of pressure values from the pressure sensors of the plurality of channels; and
      estimate a plurality of flow splits using the plurality of flow parameters for the plurality of channels of the flow splitter.

2. The flow measurement system of claim 1, further comprising:
  a plurality of mass flow controllers arranged in parallel, each being configured to flow a respective one of the plurality of pure gases; and
  a mixing chamber provided downstream of the plurality of mass flow controllers and configured to mix the plurality of pure gases to produce the gas mixture, wherein
  the flow splitter is provided downstream of the mixing chamber; and
  the executable instructions, in response to execution by the processor, cause the processor to control the flow splitter in accordance with the estimated plurality of flow splits.

3. The flow measurement system of claim 1, wherein the mathematical model is at least one of a computational-fluid-dynamics model, a one-dimensional method, or an artificial neural network.

4. The flow measurement system of claim 1, wherein
the physical properties for each of the pure gases and for the gas mixture include at least one of virial coefficient, molecular weight, viscosity, and heat capacity; and
the plurality of flow parameters include at least a flow rate or a Mach number.

5. The flow measurement system of claim 4, wherein the viscosity is estimated using at least one of Wilke's method or Reichenberg's method.

6. The flow measurement system of claim 4, wherein the virial coefficient is estimated using at least one of Tsonopoulos' method or Peng-Robinson's equation of state.

7. The flow measurement system of claim 4, wherein the pure gases include a first gas and a second gas, the first gas having a first viscosity and the second gas having a second viscosity, and the first viscosity is determined for the first gas by:
receiving a plurality of flow rate values, a plurality of pressure values, and a plurality of temperature values from the mass flow controller for a reference gas, for the second gas, and for the first gas by flowing the reference gas, the second gas, and the first gas through a restrictor, respectively;
estimating a plurality of physical properties and a plurality of flow parameters for each of the reference gas, the second gas, and the first gas using the plurality of flow rate values, the plurality of pressure values, and the plurality of temperature values;
determining a plurality of viscosity values of the second gas using the mathematical model, the plurality of physical properties, and the plurality of flow parameters;
selecting a set of viscosity values of the second gas from the plurality of viscosity values of the second gas according to a set of constraints;
determining a difference in viscosity between a known viscosity of the second gas and an average of the selected set of viscosity values;
reducing the difference in viscosity by repeating the steps of selecting the set of viscosity values of the second gas and determining the difference in viscosity;
establishing an optimal set of constraints by reducing the difference in viscosity;
determining a plurality of viscosity values of the first gas using the mathematical model, the plurality of physical properties, and the plurality of flow parameters; and
selecting a set of viscosity values of the first gas from the plurality of viscosity values according to the optimal set of constraints.

8. The flow measurement system of claim 1, wherein a plurality of flow rates for the plurality of channels of the flow splitter are calculated using a flow formula $F=F'F''$, where $F'$ is a polynomial function or a hyperbolic function.

9. The flow measurement system of claim 1, further comprising a temperature sensor, wherein
the processor is configured to receive a plurality of temperature values from the temperature sensor; and
a plurality of flow rates for the plurality of channels of the flow splitter are estimated using the temperature values from the temperature sensor.

10. The flow measurement system of claim 1, further comprising a flow rate sensor, wherein
the processor is configured to receive a plurality of flow rates from the flow rate sensor; and
the plurality of flow rates for the plurality of channels of the flow splitter are determined using the plurality of flow rates from the flow rate sensor.

11. The flow measurement system of claim 10, wherein the flow rate sensor is at least one of a mass flow controller, a restrictor, an orifice, a heated capillary, or a measurement chamber.

* * * * *